(12) United States Patent  
O'Leary

(10) Patent No.: US 7,182,855 B1
(45) Date of Patent: Feb. 27, 2007

(54) FUEL FILTER WITH VALVE INDICATOR

(76) Inventor: Patrick Owen O'Leary, 3417 Wythe Ave., Richmond, VA (US) 23221

( * ) Notice: Subject to any disclaimer, the term of this patent is extended or adjusted under 35 U.S.C. 154(b) by 416 days.

(21) Appl. No.: 10/756,994

(22) Filed: Jan. 15, 2004

(51) Int. Cl.
B01D 35/143 (2006.01)
B01D 35/147 (2006.01)

(52) U.S. Cl. .............................. 210/90; 210/91; 210/94; 210/132; 116/277; 123/196 A; 340/607

(58) Field of Classification Search ................ 116/264, 116/268, 277; 340/607; 210/130, 132, 90, 210/91, 94; 123/196 A
See application file for complete search history.

(56) References Cited

U.S. PATENT DOCUMENTS

| 4,322,290 A | 3/1982 | Carl |
| 4,574,836 A | 3/1986 | Barnard, Jr. |
| 5,766,449 A | 6/1998 | Davis |
| 5,858,227 A | 1/1999 | Stone et al. |
| 6,171,492 B1 | 1/2001 | Hedgepath et al. |

Primary Examiner—Terry K. Cecil

(57) ABSTRACT

A fuel filter includes a first filter chamber, a second filter chamber and a valve assembly disposed between the first and second filter chambers. The valve assembly includes a valve casing with a valve head connected to a flag indicator slidably disposed within the valve casing and movable between a first and second position. A port located in the valve casing allows fuel to flow from the first filter chamber to the second filter chamber when the valve head and flag indicator moves from the first position to the second position. A transparent portion of the valve casing allows the flag indicator to be visible in the second position allowing a user to determine that the fuel filter must be serviced or removed and replaced.

14 Claims, 5 Drawing Sheets

FUEL FILTER WITH VALVE INDICATOR

BACKGROUND OF THE INVENTION

1. Field of Invention

This invention relates to fuel filter assemblies. Specifically, this invention relates to a fuel filter having a valve and flag indicator that signals a user when the fuel filter should be replaced.

2. Description of Related Art

Various types of fuel filters are known in the prior art. In the case of internal combustion engines, fuel filters insure that clean, filtered fuel is delivered by a fuel pump from a fuel tank to an engine's carburetor or fuel injectors. A typical fuel filter of the prior art may include a filter element enclosed in a housing having an inlet and outlet. The inlet and outlet allow the filter to be connected to a fuel system of an internal combustion engine. The filter element of a typical fuel filter may consist of a frame or reinforcing member connected to a filter media. The filter media may be constructed of a porous material, such as paper or other synthetic material. The filter media traps particulate matter and impurities, while allowing clean fuel to pass on to the engine's carburetor or fuel injectors.

During use, the filter media may become clogged with impurities. As the filter media becomes clogged, the fuel pump discharge pressure, as measured at the outlet of the pump, will increase and the volume of fuel flow to the engine's carburetor or fuel injectors will decrease. Eventually, if left unchecked, the filter media may become so clogged that the fuel pump will no longer be able to provide enough fuel to the engine for normal operation and the engine may stall or refuse to start. Alternatively, the fuel pump may produce enough discharge pressure to rupture the filter element, allowing contaminants and impurities to flow to the carburetor or fuel injectors.

Various methods have been used to determine when a fuel filter should be replaced. For example, some fuel filters of the prior art have transparent housings that allow the user to visually inspect the filter media. If the filter media appears to be dirty the user may disassemble the filter and replace only the filter element, or the user may simply remove and replace the entire filter. Another method commonly employed is to periodically replace the entire filter assembly as part of a routine maintenance program. Other filter assemblies may be periodically disassembled and cleaned.

SUMMARY OF THE INVENTION

It is often difficult to make an exact determination of when a fuel filter has reached the end of its useful life. In the case of fuel filters that have transparent housings, a discoloration of the filter media may be taken for a clogged filter condition, causing the user to prematurely change a functioning fuel filter. Even when particulate matter or contaminants are clearly visible on the filter media, it is still difficult to accurately determine the true fuel flow across the filter media. In addition, a user must take the time to carefully inspect the filter to attempt to determine whether it should be changed. Depending on the location of the fuel filter, for example in the engine compartment of a vehicle or other device, it may be difficult for the user to gain access to the filter in order to make this visual determination.

Periodic replacement of the fuel filter during routine maintenance may alleviate the need to make a visual determination of the condition of the filter. However, a user may inadvertently change a filter that still has a significant amount of useful life. In the alternative, a filter may become completely clogged between routine maintenance causing the device to fail. For example, a contaminated batch of fuel could cause the premature failure of a fuel filter. In addition, a fuel filter problem could be misdiagnosed as a carburetion, fuel injector or fuel pump problem.

Other fuel filters can be disassembled and cleaned, or only the filter element replaced. However, these filters still do not provide a positive method of determining whether there is adequate fuel flow across the filter media. A user must disassemble the filter, clean or replace the filter media, reassemble the filter, place it back in the fuel line and attempt to operate the device in order to determine whether it was truly necessary to service the filter.

An object of this invention is to provide a fuel filter having duel filter chambers wherein a valve assembly simultaneously allows fuel to flow from a primary chamber to a secondary chamber while actuating a flag indicator. The flag indicator signals a user that the fuel filter should be changed at the user's earliest convenience. A further object of the present invention is to allow filtered fuel to continue to flow to the engine through the secondary chamber while indicating to the user that the filter is near the end of its useful life. The flag indicator of the present invention allows the user to make a positive determination that the filter must be changed or serviced and eliminates the guess work involved with the filters of the prior art.

In various exemplary embodiments of the present invention the flag indicator is electronically connected to a remotely located indicator device. For example, an indicator light located on the dash board of a vehicle. In this embodiment deployment of the indicator flag would be signaled by the light on the dashboard of the vehicle, thus indicating to the user that the fuel filter should be changed or serviced. In this way it is not necessary for the user to visually inspect the fuel filter. The electronic connection between the fuel filter and the remotely located indicator device may include a proximity sensor that senses the presence of the flag indicator, or it may include any now known or later developed device capable sensing the location of an object and electronically transmitting a signal.

In various exemplary embodiments of the present invention a housing encases a first filter chamber and a second filter chamber. The first filter chamber acts as the primary filter chamber for the majority of the useful life of the fuel filter. Fuel passes to the interior of the first filter chamber via an inlet that is connected to a fuel line. In normal operation fuel passes into the first filter chamber, through a filtration media to an external passageway, out of the fuel filter outlet and on to the engine. As the first filter chamber becomes clogged with impurities the internal pressure within the first filter chamber begins to increase. When the pressure reaches a predetermined amount, a valve assembly is activated allowing fuel to pass into a second filter chamber. The second filter chamber has a portion of unused fuel media remaining, through which unfiltered fuel may continue to pass. Thus, filtered fuel continues to flow to the engine. When the valve assembly is activated, an indicator flag moves from a first position to a second position, indicating to the user that the filter should be changed or serviced.

In various exemplary embodiments of the present invention the valve assembly may include a valve head located within a valve casing that seats against a valve seat in a wall that divides the first filter chamber from the second filter chamber. In normal operation the valve head seals the first filter chamber from the second filter chamber. A stem portion connects the valve head to a flag indicator. When the valve assembly is actuated, fluid pressure provided by the fuel pump, urges the head away from the chamber dividing wall, thus allowing fuel into the second filter chamber. The flag indicator moves simultaneously within the valve assembly to a transparent portion of the valve casing located externally on the fuel filter housing. When the flag indicator is visible within the transparent portion of the valve casing the user can observe that the filter should be changed or serviced. In other exemplary embodiments the presence of the flag indicator within the transparent portion of the filter is signaled to a remotely located indicator device electronically.

In various exemplary embodiments the valve head has arms with contact points that seat against ribs within the valve casing. The arms allow the valve head to remain seated against the valve seat in the chamber wall during normal operation. When the fluid pressure reaches a predetermined amount the arms are forced in an inward direction allowing the contact points to slide passed the ribs of the valve casing. The length and thickness of the arms may be varied corresponding to the desired release point of the valve head. In addition the shape and size of the contact points may be varied to correspond to the desired release point of the valve head.

The release point of the valve head may vary according to the volume and discharge pressure of the engine fuel pump. Typically, when a fuel filter of the prior art became clogged with impurities the flow of the fuel pump is reduced to the point that the carburetor or fuel injectors are starved of fuel, causing the engine to stall or refuse to start. In this scenario the fuel pump is in a near a "dead head" or no flow condition. Typically when a fuel pump is in a dead head condition it produces its greatest output pressure. Thus, with the fuel filter of the present invention, it is desirable to set the valve head release point at a pressure below the dead head pressure of the pump. For example, the valve head may be set to release at 90% of the pump output pressure in a dead head condition. In this way the valve assembly will be actuated prior to the carburetor or fuel injectors becoming starved of fuel. However, the valve head release point should be set sufficiently high to prevent the valve assembly from being actuated prior to the first or primary filter chamber becoming clogged or reaching a near clogged condition.

While the fuel filter of this invention may be used in a fuel system where the fuel filter is located between the fuel pump and carburetor or fuel injectors, it should be appreciated that the device of this invention may also be used with fuel systems where the fuel filter is located between the fuel tank and fuel filter. In this application the valve assembly would be activated by the pressure differential across the valve head due to the partial vacuum or suction pressure created by the pump. The net positive suction head required by the fuel pump should also be taken into account in this application when setting the release point of the valve head.

In various exemplary embodiments an urging member assists the valve head in moving from a first position to second position. The urging member urges the valve head, stem and flag indicator to a fully deployed position such that the flag indicator is clearly visible in the transparent portion of the valve assembly on the external portion of the filter housing. The urging member also assists the valve head to advance within the valve assembly to allow fuel flow into the secondary chamber. The urging member may assist in situations where the fuel pump does not produce a sufficient amount of pressure to fully actuate the valve assembly, such that the flag indicator may only be deployed part way into the transparent portion of the valve casing. Likewise, in some embodiments the fuel pump output pressure may not be sufficient to advance the valve head a great enough distance to allow sufficient flow to the secondary chamber. As such, the urging member may assist to insure that the valve head, stem and flag indicator are fully deployed.

These and other features and advantages of this invention are described in or are apparent from the following detailed description of the preferred embodiments.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
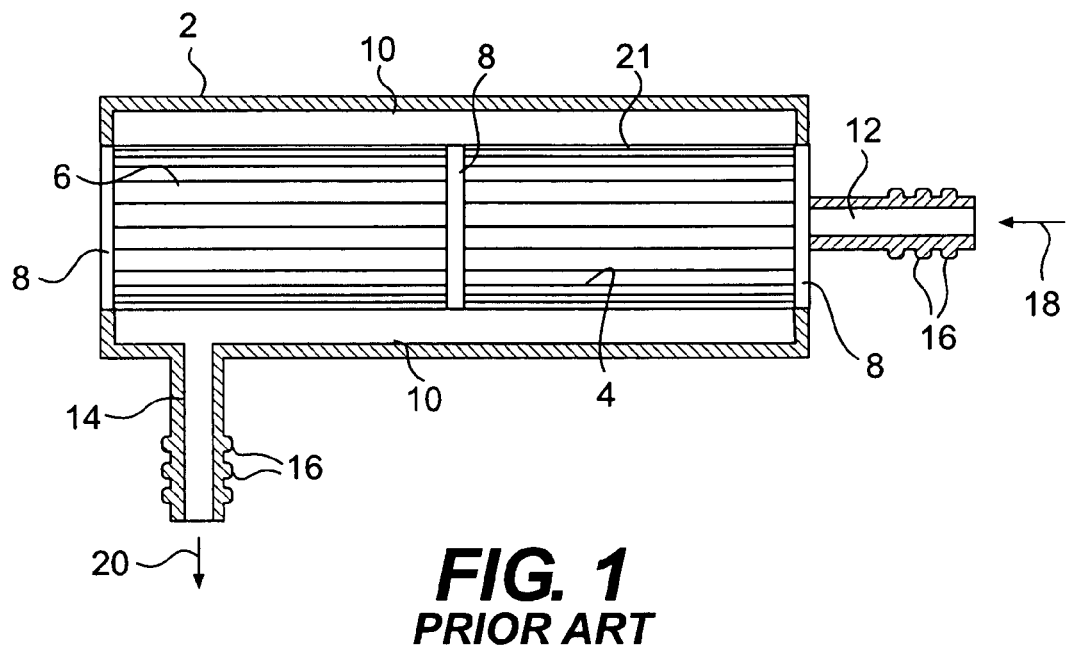
FIG. 1 is a cross-sectional side view of a fuel filter of the prior art.

FIG. 1 illustrates a cross-sectional side view of a fuel filter of the prior art. This fuel filter has a housing 2 that encases a cylinder shaped filter element 4. The housing 2 has an inlet 12 and an outlet 14, each having ribs 16 that facilitate connection to fuel lines (not shown). Typically, the fuel lines would be clamped in place onto the inlet 12 and outlet 14. The filter element 4 may consist of a cylinder shaped filter media 21 that is held in place by filter media retainers 8. The filter media retainers 8 may vary in size, shape and location and may act to reinforce the filter media 21. The housing may be removed and the filter element 4 may be cleaned or replaced. Unfiltered fuel from the fuel tank flows into the filter via inlet 12 in flow direction 18. The unfiltered fuel then passes into the internal chamber 6, through the filter media 21, through the external passage way 10 to the outlet 14 and on to the carburetor or fuel injectors (not shown) in flow direction 20. Impurities in the unfiltered fuel are typically trapped on the internal portion of the filter media 21. When the filter media 21 becomes clogged with impurities the discharge pressure of the fuel pump increases until, if left unchecked, the engine becomes starved of fuel. Because it is difficult to determine when the fuel filter of FIG. 1 has reached the end of its useful life, it is often changed during routine maintenance of the engine. However, often times this leads to the changing and wasting of a functioning fuel filter.

Figure 2:
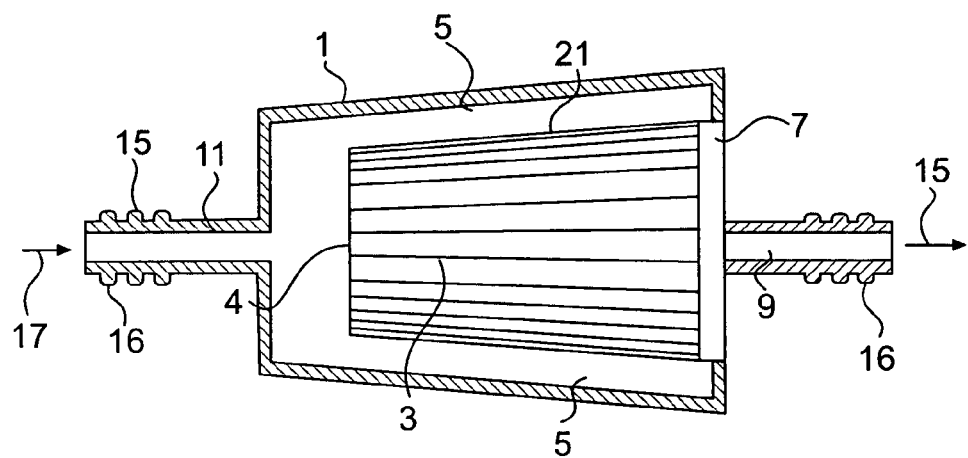
FIG. 2 is a cross-sectional side view of another fuel filter of the prior art.

FIG. 2 illustrates a cross-sectional view of another fuel filter of the prior art. This fuel filter has a conical shaped housing 1 that encases a conical shaped filter element 4. Filter media 21 is held in place by filter media retainer 7. Fuel enters and leaves the housing via inlet 11 and outlet 9, each having ribs 16 that facilitate connection to fuel lines (not shown). In contrast to the fuel filter of FIG. 1, this fuel filter traps impurities on the external portion of the filter media 21. Unfiltered fuel from the fuel tank (not shown) travels in flow direction 17 into the filter and through the external passageway 5. Fuel then passes through the filter media 21 and into internal chamber 3. Impurities are trapped on the external portion of the filter media 21 as the fuel passes from the external passage way 5 to the internal chamber 3. The filtered fuel then travels through outlet 9 in flow direction 15 on to the carburetor or fuel injectors. In some embodiments the housing 1 is constructed of a transparent material such that the user may visually inspect the condition of the filter media 21.

The filter of FIG. 2 may be completely discarded or the filter media 21 may be replaced. However, because the filter media 21 may become discolored or may have impurities accumulated on its surface, a user may falsely determine that the filter of FIG. 2 has reached the end of its useful life. In fact, the filter of FIG. 2 may have a significant amount of useful life remaining, despite the discoloration of the filter media 21, or the visual indication of contaminates on the surface of the filter media 21. In addition, because a user may incorrectly determine that the fuel filter of FIG. 2 is the cause of an engine problem, the user may unnecessarily disassemble or change the fuel filter of FIG. 2. If this is undertaken prior to allowing the engine to cool, a fuel spill could occur creating a safety hazard.

Figure 3:
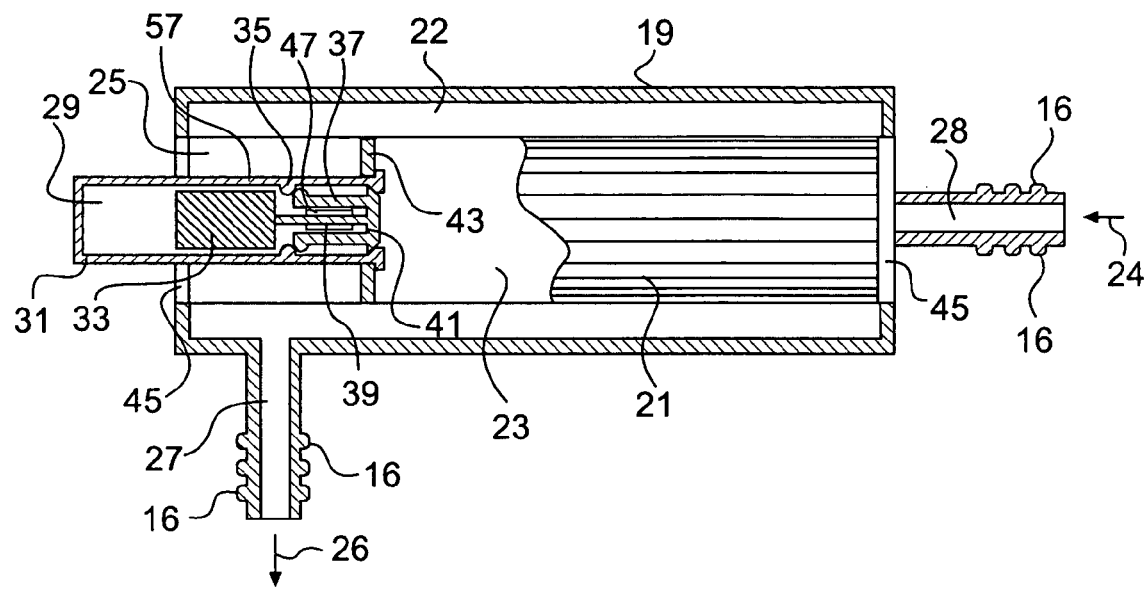
FIG. 3 is a cross-sectional side view of an exemplary embodiment of a fuel filter of this invention having a valve assembly.

FIG. 3 is a cross-sectional side view of an exemplary embodiment of a fuel filter of this invention having a valve assembly 29. The fuel filter according to this exemplary embodiment has a housing 19 that encases a first filter chamber 23 and a second filter chamber 25. The housing 19 has an inlet 28 and an outlet 27, each having ribs 16 that facilitate connection to fuel lines (not shown). The fuel lines may be clamped in place onto the inlet 28 and outlet 27. However, it should be appreciated that the fuel filter of this invention may be connected to a fuel system by any means now known or later developed. The first filter chamber 23 and second filter chamber 25 are surrounded by filter media 21 and are divided by chamber wall 43. Filter media 21 is retained in place by filter media retainers 45. During normal operation unfiltered fuel from the fuel tank (not shown) flows into the filter via inlet 28 in flow direction 24. The unfiltered fuel then passes into the first chamber 23, through the filter media 21, through the external passage way 22 to the outlet 27 and on to the carburetor or fuel injectors (not shown) in flow direction 26. Impurities in the unfiltered fuel are typically trapped on the internal portion of the filter media 21.

When the filter media 21 becomes clogged with impurities the discharge pressure of the fuel pump (not shown) increases creating a pressure differential across the filter media 21 of the first filter chamber 23. This pressure differential is also created between the first filter chamber 23 and the second filter chamber 25. The increased pressure within the first filter chamber 23 exerts a force on valve head 41. When the force on valve head 41 reaches a predetermined amount, the valve assembly 29 is actuated causing valve head 41 to move axially within the valve casing 57. The axial movement of the valve head 41 simultaneously allows fuel to flow through the valve casing 57 and into the second chamber 25. The valve head 41 is attached to the flag indicator 33 by the stem 39 and moves the flag indicator 33 into the transparent portion 31 of valve casing 57. Thus, unfiltered fuel continues to be filtered in the second filter chamber 25. As such, the valve assembly 29 allows unfiltered fuel to pass into the second filter chamber 25 while simultaneously moving the indicator flag 33 into transparent portion 31. When the flag indicator 33 is visible in the transparent portion 31, the user may positively determine that the fuel filter of FIG. 3 must be replaced or serviced.

It should be appreciated that in various exemplary embodiments the housing 19 may be removed to facilitate removal and replacement of the filter media 21. In other exemplary embodiments the filter media 21 may be attached to a cartridge or comprise a subcomponent of a filter element that may also be removed and replaced. In various exemplary embodiments having replaceable filter media or filter elements, the valve head 41 may be reset when the filter is reassembled to allow the valve assembly 29 to again be actuated. However, in other exemplary embodiments the entire fuel filter may be disposable. It should also be appreciated that in other exemplary embodiments of the invention the flow direction of the fuel across the filter media may be reversed, such that fuel flows from the external passageway 22 to the interior portion of the first filter chamber 23 and second filter chamber 25. In these embodiments the valve assembly 29 must be located and arranged to function accordingly.

Figure 4:
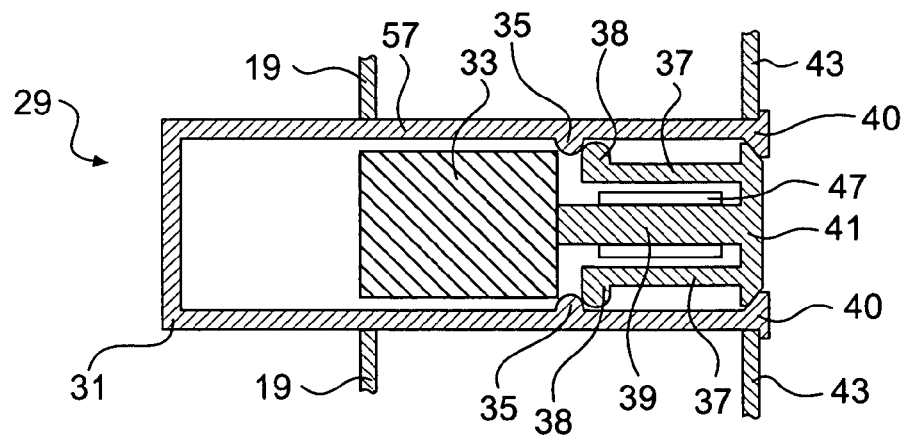
FIG. 4 is an enlarged cross-sectional view of the valve assembly shown in FIG. 3.

FIG. 4 is an enlarged cross-sectional side view of valve assembly 29 shown in FIG. 3. The valve assembly 29 has a valve casing 57 that accommodates the valve head 41 connected to the flag indicator 33 by stem 39. Valve casing 57 has a valve seat 40 that accommodates the valve head 41 and creates a liquid tight seal. The valve casing is mounted in the housing 19 and the chamber wall 43. Valve head 41 has arms 37 that flex or deflect inward towards the stem 39 when the valve assembly 29 is actuated. During normal use the contact points 38 of arms 37 are seated against retainer rib 35 on the interior of the valve casing 57. When the seal created between valve head 41 and valve seat 40 begins to crack due to the pressure in the first filter chamber 23, arms 37 flex towards the stem 39 allowing contact points 38 to slide past the retainer rib 35 on the interior of valve casing 57. As valve head 41 moves axially away from valve seat 40, fuel enters the valve assembly 29. Fuel then exits the valve assembly 29 via port 47 located in the wall of valve casing 57. Fuel travels through port 47 into the second filter chamber 25, where it passes through the filter media 21 surrounding second filter chamber 25. Fuel then passes into the external passageway 22 and exits the housing 19 via outlet 27. Because valve head 41 is connected axially to the indicator flag 33 by stem 39, the fuel pressure acting against the valve head 41 also causes the indicator flag 33 to move into the transparent portion 31 of valve casing 57.

When the flag indicator 33 is visible in the transparent portion 31 of the valve casing 57 the user can determine that the filter must be changed or is in need of servicing. In various exemplary embodiments of this invention fuel pressure alone will be sufficient to propel the indicator flag 33 into the transparent portion 31 of the valve casing 57. However, in other embodiments an urging member may urge the indicator flag 33 into the transparent portion 31. It should be appreciated that the flexibility, size and shape of arms 37 may be varied to allow valve head 41 to open at the desired fuel pump pressure. In addition, the shape and size of the contact points 38 and retainer rib 35 may also be varied according to design requirements.

Figure 5:
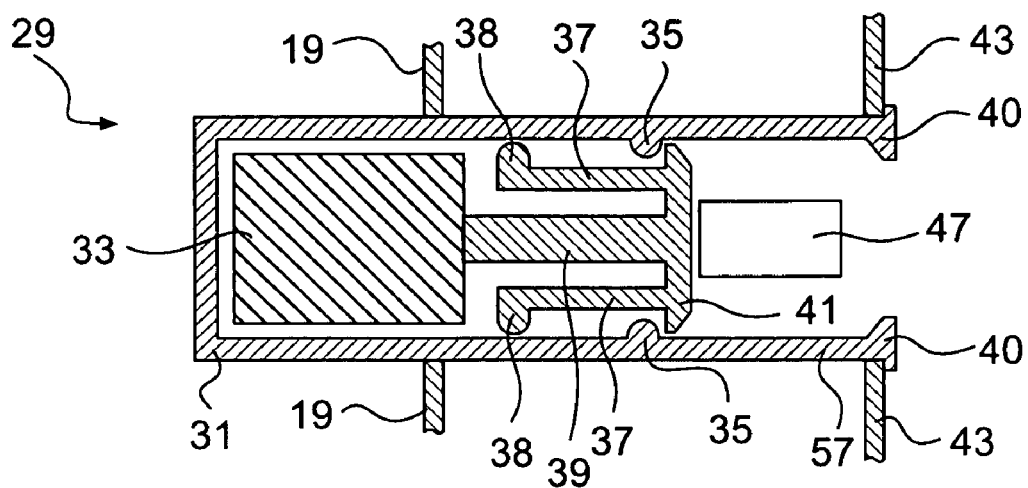
FIG. 5 is another enlarged cross-sectional view of the valve assembly shown in FIG. 3.

FIG. 5 is another enlarged cross-sectional side view of the valve assembly 29 shown in FIG. 3. In this view the valve head 41, stem 39 and indicator flag are illustrated in the deployed position. In this exemplary embodiment retainer rib 35 acts as a stop for valve head 41. However, in other exemplary embodiments the axial motion of the valve head may be stopped by other means. For example, the transparent portion 31 of the valve casing 57 may stop the motion of the indicator flag 33, stem 39 and valve head 41. With the valve head 41 deployed, fuel enters the valve casing 57 and exits through port 47 into second chamber 25. Indicator flag 33 is deployed inside transparent portion 31 of valve casing 57, signaling to a user that the filter is in need of changing or servicing.

Figure 6:
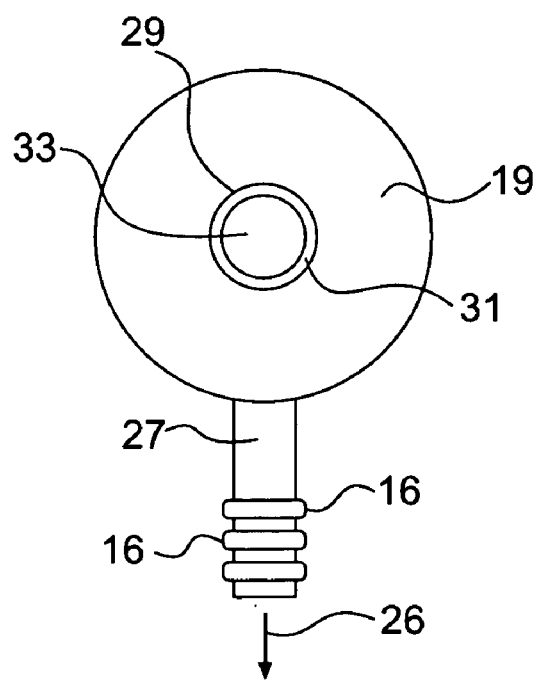
FIG. 6 is an end view of an exemplary embodiment of a fuel filter according to this invention.

FIG. 6 is an end view of an exemplary embodiment of a fuel filter according to this invention. In this view the transparent portion 31 of valve casing 57 protrudes from housing 19. Indicator flag 33 is visible within the transparent portion of 31 of valve casing 57. Also located on this end of the fuel filter is the outlet 27 having ribs 16. fuel flows out of the filter in flow direction 26.

Figure 7:
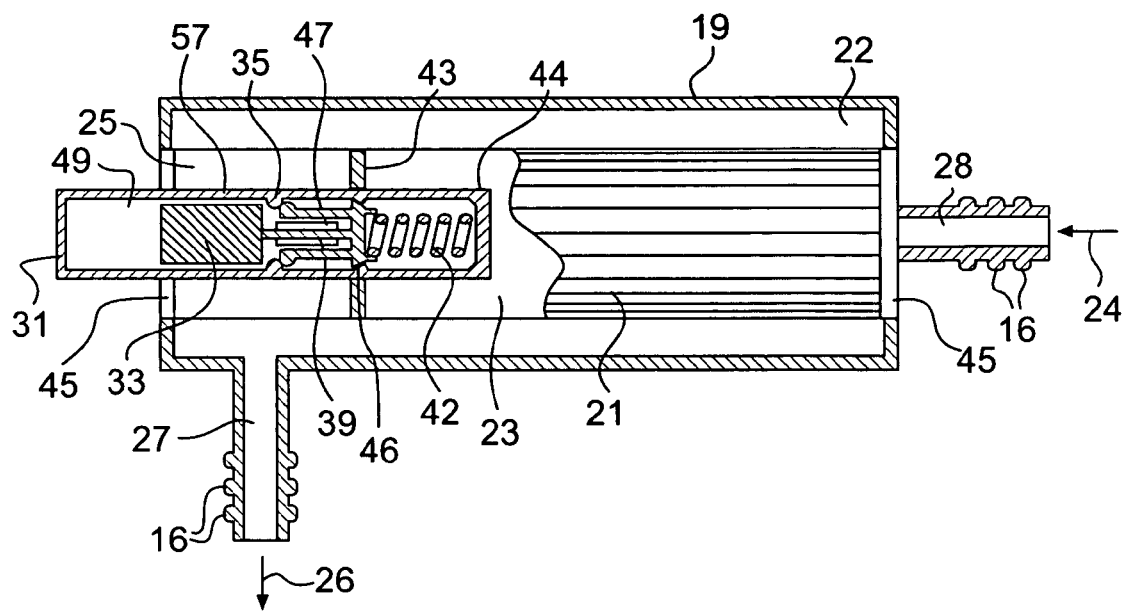
FIG. 7 is a cross-sectional side view of an exemplary embodiment of a fuel filter of this invention having a valve assembly with urging member.

FIG. 7 is a cross-sectional side view of an exemplary embodiment of a fuel filter of this invention having a valve assembly 49 with urging member 42. The fuel filter according to this exemplary embodiment has a housing 19 that encases a first filter chamber 23 and a second filter chamber 25. The housing 19 has an inlet 28 and an outlet 27, each having ribs 16 that facilitate connection to fuel lines (not shown). The first filter chamber 23 and second filter chamber 25 are surrounded by filter media 21 and are divided by chamber wall 43. Filter media 21 is retained in place by filter media retainers 45. During normal operation unfiltered fuel from the fuel tank (not shown) flows into the filter via inlet 28 in flow direction 24. The unfiltered fuel then passes into the first chamber 23, through the filter media 21, through the external passage way 22 to the outlet 27 and on to the carburetor or fuel injectors (not shown) in flow direction 26. Impurities in the unfiltered fuel are typically trapped on the internal portion of the filter media 21.

When the filter media 21 becomes clogged with impurities the discharge pressure of the fuel pump increases creating a pressure differential across the filter media 21 of the first filter chamber 23. This pressure differential is also created between the first filter chamber 23 and the second filter chamber 25. The increased pressure within the first filter chamber 23 exerts a force on valve head 46. When the force on valve head 46 reaches a predetermined amount, the valve assembly 29 is actuated causing valve head 46 to move axially within the valve casing 57. In this exemplary embodiment valve assembly 49 has urging member 42 located in urging member housing 44. Urging member 42 exerts a force against valve head 46, urging valve head 46, stem 39 and indicator flag 33 in an axial direction towards the transparent portion 31 of valve casing 57. Urging member 42 assists in deploying the valve head 46, stem 39 and indicator flag 33 in conjunction with the fuel pressure in first filter chamber 23.

The axial movement of the valve head 46 simultaneously allows fuel to flow through the valve casing 57 and into the second chamber 25. The valve head 46 is attached to the flag indicator 33 by the stem 39 and moves the flag indicator 33 into the transparent portion 31 of valve casing 57. Thus, unfiltered fuel continues to be filtered in the second chamber 25. As such, the valve assembly 49 allows unfiltered fuel to pass into the second filter chamber 25 while simultaneously moving the indicator flag 33 into transparent portion 31. When the flag indicator 33 is visible in the transparent portion 31, the user may positively determine that the fuel filter of FIG. 3 must be replaced or serviced.

It should be appreciated that in various exemplary embodiments the housing 19 may be removed to facilitate removal and replacement of the filter media 21. In other exemplary embodiments the filter media 21 may be attached to a cartridge or comprise a subcomponent of a filter element that may also be removed and replaced. In various exemplary embodiments having replaceable filter media or filter elements, the valve head 46 may be reset when the filter is reassembled to allow the valve assembly 49 to again be actuated. However, in other exemplary embodiments the entire fuel filter may be disposable.

Figure 8:
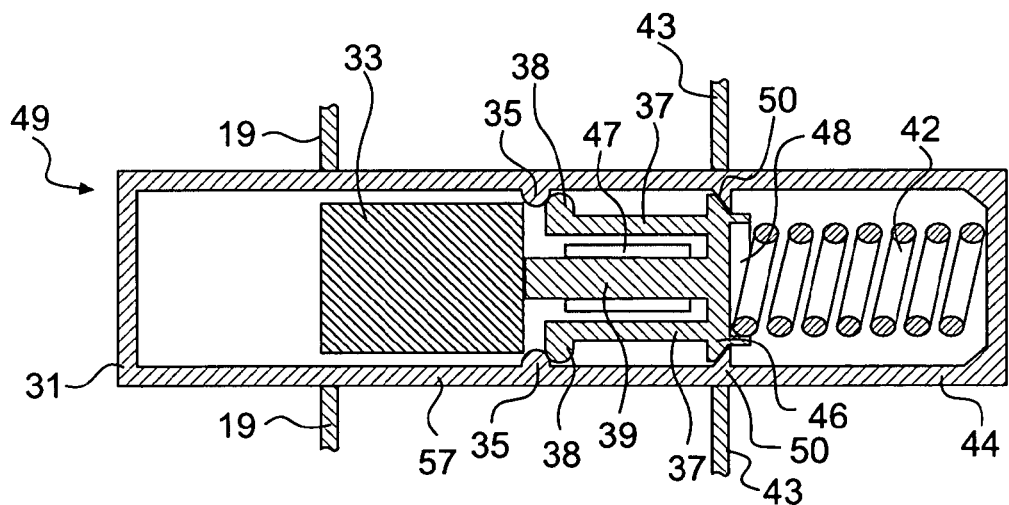
FIG. 8 is an enlarged cross-sectional view of the valve assembly shown in FIG. 7.

FIG. 8 is an enlarged cross-sectional side view of valve assembly 49 shown in FIG. 7. The valve assembly 49 has a valve casing 57 that accommodates the valve head 46 connected to the flag indicator 33 by stem 39. In this embodiment valve head 46 has urging member accommodating portion 48 that allows urging member 42 to be seated against valve head 46. urging member accommodating portion 48 also prevents lateral movement of urging member 42 while in contact with valve head 46. Urging member 42 is located in urging member housing 44 which provides an opposing surface for urging member 42. Urging member housing 44 is open to allow fuel flow from the first chamber 23 to the second chamber 25 when valve assembly 49 is actuated. Urging member 42 is illustrated as a helical spring. However, it should be appreciated that any type of urging member may be used with the device of this invention without departing from the spirit and scope of the invention.

Valve casing 57 has a valve seat 50 that accommodates the valve head 41 and creates a liquid tight seal. The valve casing is mounted in the housing 19 and the chamber wall 43. Valve head 46 has arms 37 that flex or deflect inward towards the stem 39 when the valve assembly 49 is actuated. During normal use the contact points 38 of arms 37 are seated against retainer rib 35 on the interior of the valve casing 57. When the seal created between valve head 46 and valve seat 50 begins to crack due to the pressure in the first chamber 23, arms 37 flex towards the stem allowing contact points 38 to slide past the retainer rib 35 on the interior of valve casing 57. As valve head 46 moves axially away from valve seat 50, fuel enters the valve assembly 49. Fuel then exits the valve assembly 49 via port 47 located in the wall of valve casing 57. Fuel travels through port 47 into the second chamber 25 where it passes through the filter media 21 surrounding second filter chamber 25. Fuel then passes into the external passageway 22 and exits the housing 19 via outlet 27.

The fuel pressure and urging member acting against the valve head 46 also cause the indicator flag 33 to move into the transparent portion 31 of valve casing 57. When the flag indicator 33 is visible in the transparent portion 31 of the valve housing 57 the user can determine that the filter must be changed or is in need of servicing. It should be appreciated that urging member 42 may be sized or selected in conjunction with the flexibility of the arms 37, to allow valve head 46 to open at the desired fuel pump pressure. In addition, the shape and size of the contact points 38 and retainer rib 35 may also be varied according to design requirements.

Figure 9:
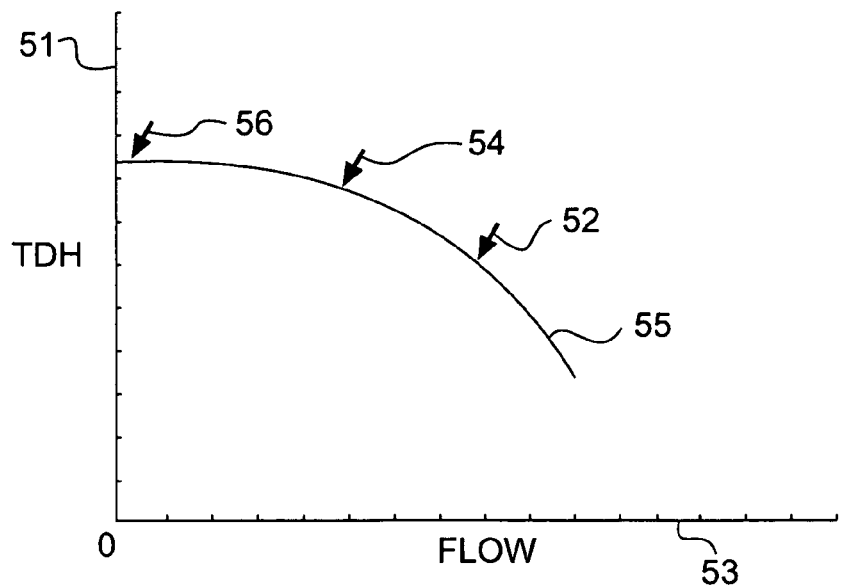
FIG. 9 is an illustration of a typical fuel pump curve.

FIG. 9 is an illustration of a typical fuel pump curve. Axis 51 represents total dynamic head or fuel pump pressure. Axis 53 represents fuel flow to the carburetor or fuel injectors. Pump curve 55 generally represents the relationship between fuel flow and fuel pressure in a fuel system. While curve 55 illustrates an exponential increase in fuel pressure with decreased fuel flow, other fuel pumps may provide a linear relationship between fuel flow and pressure. Curve point 52 may represent the normal operating point, or duty point of a fuel pump. Curve point 56 illustrates the "dead head" point of the fuel pump. That is the point at which no fuel is delivered to the engine. The fuel pump may generally operate at or near this point when there is a clogged fuel filter in the fuel system.

With the device of this invention it is desirable to have the valve head 41 or valve head 46 open at some point between curve point 56 and curve point 52. For example, curve point 54. Once valve head 41 or valve head 46 open, the operating point or duty point of the fuel pump may then drop back down to a point at or near its normal duty point 52. Once valve head 41 or valve head 46 have opened, the user will be on notice that the fuel filter is in need of changing or servicing.

Figure 10:
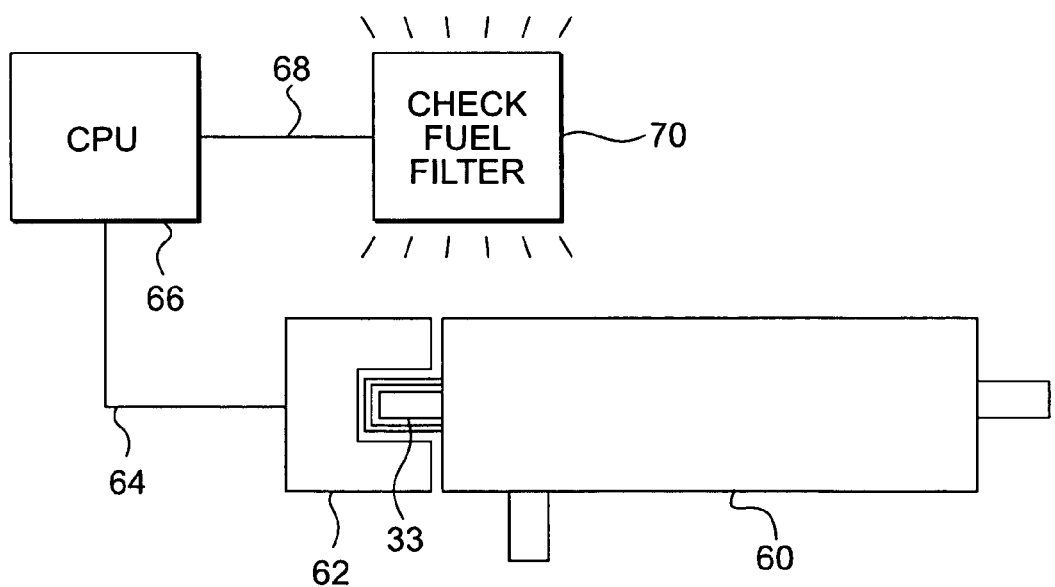
FIG. 10 is a schematic illustration of an exemplary embodiment of a fuel filter electronically connected to a remote indicator according to this invention.

FIG. 10 is a schematic illustration of an exemplary embodiment of a fuel filter electronically connected to a remote indicator according to this invention. Fuel filter 60 is illustrated having indicator flag 33 deployed. A proximity sensor 62 detects the presence of the indicator flag and sends a signal via pathway 64 to a central processing unit (CPU) 66. CPU 66 registers the signal from the proximity sensor 62 via pathway 68 and activates a warning indicator 70. The warning indicator 70 may be in the form of a light, for example, located on the dash board consol of a vehicle. The CPU 66 may be any now known or later developed processor or controller. In other exemplary embodiments the proximity sensor may directly activate the warning indicator 70 without sending a signal to the CPU 66. The proximity sensor 62 may also be any now known or later developed device capable of sensing the presence of flag indicator 33.

While this invention has been described in conjunction with specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A fuel filter usable to filter fuel, comprising:
    a housing including a first filter chamber and a second filter chamber, said first filter chamber and said second filter chamber extending longitudinally within said housing and separated by a chamber wall disposed between the first filter chamber and the second filter chamber;
    a filter element having a filter media surrounding said first filter chamber and said second filter chamber and having a central axis;
    an inlet and an outlet attached to said housing;
    a valve assembly disposed between said first filter chamber and said second filter chamber, said valve assembly further comprising;
        a valve casing attached to said chamber wall;
        a valve head slidably disposed within said valve casing and axially movable between a first valve head position and a second valve head position;
        a flag indicator slidably disposed within said valve casing that is axially movable between a first flag indicator position and a second flag indicator position and attached to a central portion of said valve head to move axially therewith;
        a port located in said valve casing that allows a fuel to flow from said first filter chamber to said second filter chamber, when said valve head moves from said first valve head position to said second valve head position;
        a transparent portion located on said valve casing that allows said flag indicator to be visible when said flag indicator is moved from said first flag indicator position to said second flag indicator position.

2. The fuel filter according to claim 1, wherein said valve casing has a rib portion located on an interior surface.

3. The fuel filter according to claim 2, wherein said valve assembly further comprises at least one arm having a contact point, said at least one arm attached to said valve head and wherein said contact point abuts said rib portion to prevent said valve head from moving from said first valve head position to said second valve head position during a normal filtering condition of said fuel filter.

4. The fuel filter according to claim 3, wherein said arm is flexible and allows said contact point to slidably move passed said rib portion of said valve casing to allow said fuel to flow into said second fuel chamber during a bypass condition.

5. The fuel filter according to claim 1, wherein said valve assembly further comprises an urging member that assists in urging said valve head from said first valve head position to said second valve head position during said bypass condition.

6. The fuel filter according to claim 5, wherein said valve assembly further comprises an urging member housing that houses said urging member.

7. The fuel filter according to claim 6, wherein said urging member housing is open to allow fuel flow into said valve assembly.

8. The fuel filter according to claim 5, wherein said valve head has an urging member accommodating portion that prevents lateral movement of said urging member.

9. The fuel filter according to claim 5, wherein said urging member is a helical spring.

10. The fuel filter according to claim 1, wherein said transparent portion located on said valve casing makes a liquid tight seal with said filter housing to prevent fuel from leaking to an external portion of said housing.

11. The fuel filter according to claim 1, wherein said fuel filter is electronically connected to a remote indicator to signal a condition of said fuel filter.

12. The fuel filter according to claim 1, wherein said fuel filter is electronically connected to a central processing unit to signal a condition of said fuel filter.

13. The fuel filter according to claim 1, wherein said central processing unit is electronically connected to a warning light on a consol of a vehicle.

14. A vehicle having an internal combustion engine, further comprising the fuel filter of claim 1.

* * * * *